R. W. JONES.
WINDING AND REWINDING MACHINE.
APPLICATION FILED DEC. 18, 1917.

1,274,891.

Patented Aug. 6, 1918.

UNITED STATES PATENT OFFICE.

ROBERT W. JONES, OF WILKES-BARRE, PENNSYLVANIA.

WINDING AND REWINDING MACHINE.

1,274,891.  Specification of Letters Patent.  Patented Aug. 6, 1918.

Application filed December 18, 1917. Serial No. 207,807.

*To all whom it may concern:*

Be it known that I, ROBERT W. JONES, a citizen of the United States, residing at Wilkes-Barre, Luzerne county, Pennsylvania, have invented new and useful Improvements in Winding and Rewinding Machines, of which the following is a specification.

My invention relates to winders and rewinders for cinematograph films.

In the cinematographic or motion picture art, the strips of film, which are of various lengths, are continuously wound and rewound from the time of their production throughout their entire life.

Much of this winding and rewinding must be effected at comparatively slow speeds, owing to the various processes and treatments through which the films pass, but after the films are developed and dried, the speed with which the future windings and rewindings take place, becomes an important factor in the art. Thus, the film as it comes from the drying drums in a coil, is unwound and inspected for imperfections, insertions, corrections or what not, after which it must be rewound. Then, each time after it has been thrown on the screen, it must be rewound, as its passage through the projecting machine winds it reversely on the receiving reel or spool. And it is in this work, that speed of rewinding is particularly necessary, in order to place the film in condition for reprojection on the screen, as soon as possible.

From the very inception of the art to the present time, films have been generally rewound by hand, the supply spool containing the coiled film being placed for rotation on a suitable support, and the outer end of the film ribbon or strip attached to an empty spool splined on the shaft of a winding machine. A manually-rotated drive shaft connected by multiplying gearing to the spline shaft, turns the latter to wind the film onto the empty spool, the film unwinding from the supply spool according to the speed of rotation of the winding spool.

Obviously, the manual winding of the film in this manner is a slow process, and necessitates considerable physical labor, especially when running off long reels of a thousand feet or more.

Consequently, attempts have been made to turn the winding spool by power, as by an electric motor.

One such device comprises a continuously running motor directly connected to the drive shaft, on which the winding spool is splined, by a belt and pulleys, no means being provided to effect a disconnection of the drive and the winding spool, or to instantaneously arrest the winding spool in case of breakage of the film or for the inspection or repair thereof. Instead, the operator, when wishing to stop the spool, must turn off the electric current supply to the motor, and wait for the latter to cease its rotations.

Incidentally, breakage of the film in winding is of frequent occurrence, and as the winding machine continues to turn under its own impetus and the weight of the reel after the power is turned off, there is great liability that the film, often worth thousands of dollars, will be irreparably damaged. The loose end unwinds from the supply spool or reel and whips itself all over the compartment, especially if the break occurs when the spools are rotating at 2000 or more R. P. M.

Not only will this rough and violent treatment injure the film, which is very likely to become caught in the belting and be torn, but also, because of its inflammability, a spark from the motor will ignite the film and result in its total destruction.

Hence, because of its many disadvantages, the uncontrolled motor-driven winding machines have not found favor among the moving picture manufacturers, dealers, or users.

To enable the films to be wound and rewound at the highest practicable speed without the disadvantages above set forth, and to enable the winding spool to be instantly arrested when desired, I have devised a motor-driven winding machine, equipped with a belt tightener and brake, alternately operable, and controlled by the foot of the operator, which is illustrated in my prior pending application, Serial No. 134,154, filed Nov. 29, 1916.

In so doing, I have taken advantage of the natural inclination of the operator (who is often a girl) to jump away from the noisy, whipping, loose end of broken film, by so arranging the mechanism, that removal of pressure on the pedal, releases the belt tightener to slacken the belt and thus prevent transmission of power from the motor to the winding spindle. Simultaneously, a brake is applied to the spindle shaft, to instantaneously arrest the rotation of the winding spool.

The present application is an improvement on the above mechanism of the prior application.

One of the objects of the present invention is the provision of an improved and novel drive mechanism for the spindle supporting the winding spool or reel, which permits of very accurate adjustments and is more readily controlled.

In the form chosen for illustration, the drive shaft which terminates at one end in a spindle, is provided with separable and coacting drive members, in combination with an endless belt, and means under control of the operator to render the drive members effective to tighten or release the belt.

Another object of the invention is the provision of instantly available means to support the belt, when released by the drive members, in position to be again acted upon by the drive members, at will.

This I accomplish by providing what I may term a "free wheel" interposable between the drive members as the belt is released, to support the loosened belt until the drive members are again operated to enable the belt to rotate the drive shaft.

The control mechanism for the drive members is operated by a spring-pressed foot pedal which also actuates a brake, as in the prior pending application.

Disabling the drive members by the removal of the foot pressure on the pedal, frees the brake for action to arrest the rotation of the winding spool, to enable the operator to inspect or repair the film when necessary without loss of time, and after such inspection or repairs are made, depression of the foot pedal releases the brake, and actuates the control members to operate the drive members and cause the transmission of rotation to the spool.

Another object of the invention is the provision of adjustments for the controlling mechanism to take up wear of the parts; to enable the control mechanism to accommodate belts of various sizes; and to synchronize the operation of the control mechanism with the operation of the brake.

Still another object is to prevent the transmission of end thrust to the drive shaft by the operation of the control members, and thereby reduce the amount of wear.

The means for controlling the actuation, or relative positions, of the drive members enables the operator to regulate the speed of rotation of the winding spool much more readily than heretofore, by regulating the relative movement imparted to the control members. By this means, the operator can control the speed at which the film is winding, with the utmost ease and exactness, whereby, without other change than the alteration of pressure of the operator's foot on the control lever, the speed at which the film is wound can be varied to suit all requirements. This is of particular value, as it is desired to inspect the film for imperfections, mending, or what not, which necessitates winding at a comparatively slow speed, and then, when the corrections or repairs have been made, to speed up the winding to the highest possible point at which the film can be run by the motor.

No motor-driven film winding machine of which I am aware, other than that shown in my pending application hereinafter referred to, is capable of such performance and control.

In the accompanying drawings.

Figure 1:
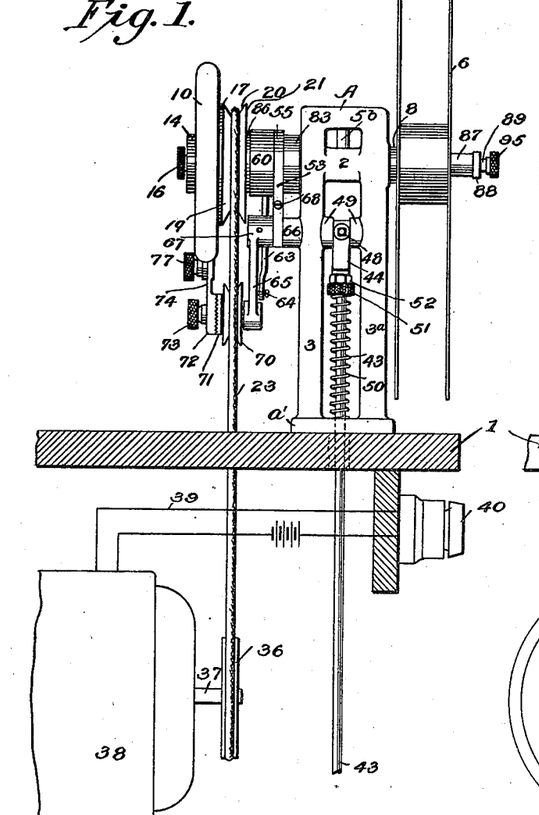
Figure 1 is a left side view of one embodiment of my invention.
Figure 2:
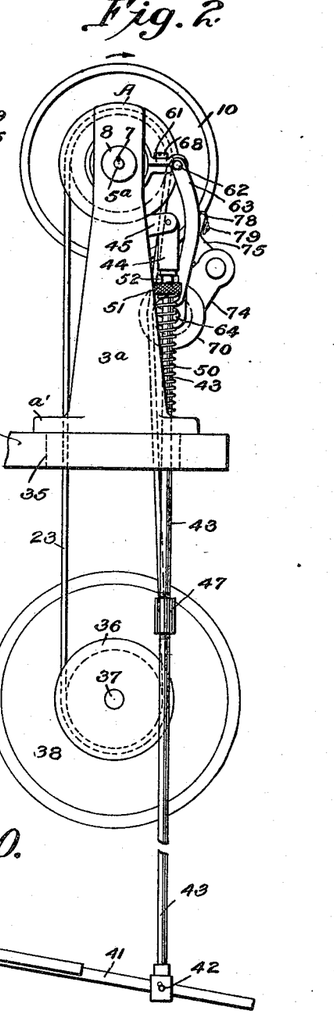
Fig. 2 is a front view thereof.
Figures 3, 4, 5, 6, 7, 8, 9:
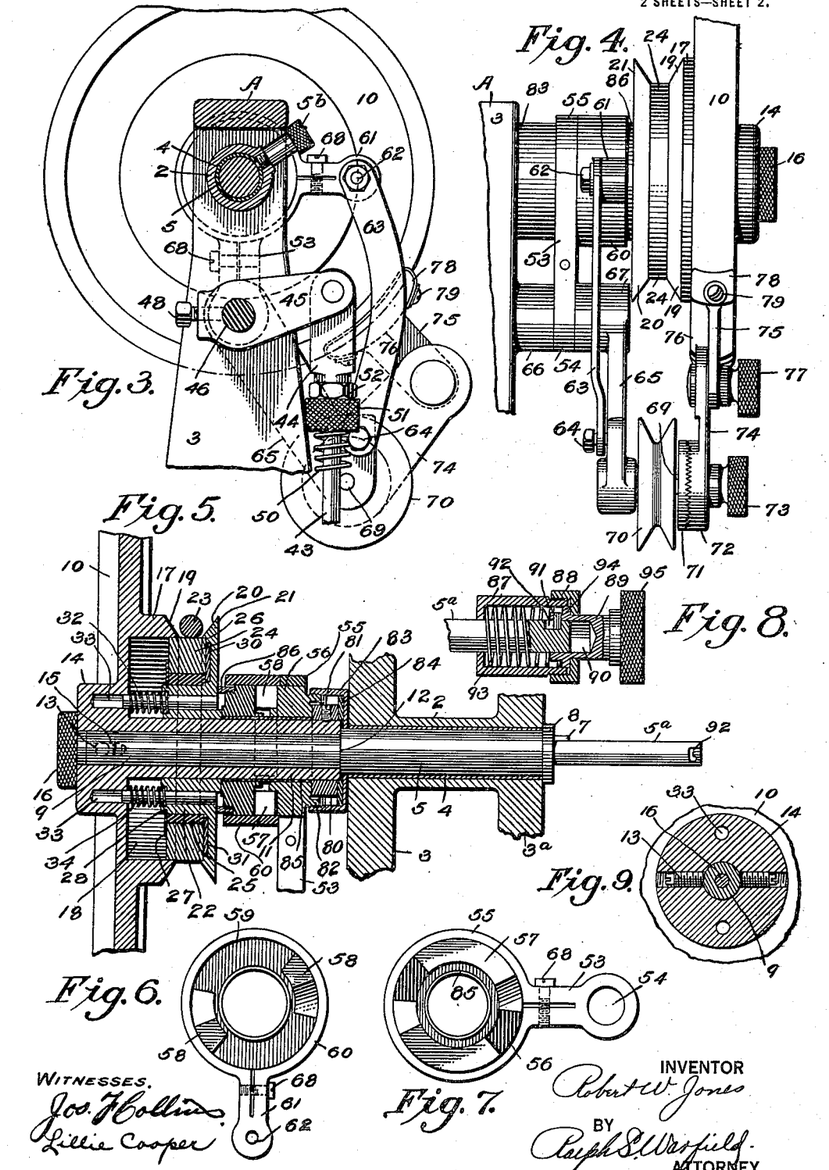
Fig. 3 is a front elevation partly in section, showing more fully, the drive and brake control.
Fig. 4 is a right side view of the drive and brake mechanisms.
Fig. 5 is a longitudinal sectional view, partly in full lines, of the drive mechanism, and its controlling means.
Figs. 6 and 7 are detail views, showing the coacting faces of the respective drive-controlling members.
Fig. 8 is a detail sectional view of the retainer for the reel.
Fig. 9 is a detail sectional view through the hub of the fast drive member, showing the manner of securing it to the drive shaft.

Referring to Figs. 1, 2 and 3, a bifurcated frame or standard A is secured to and projects upwardly from a suitable support, as a bench, table or desk 1, a hollow brace 2 connecting the legs 3, 3$^a$ of the standard at a point intermediate their ends.

The legs are apertured in alinement with the bore of the brace (Figs. 3 and 5) to accommodate a sleeve bearing 4, (preferably of bronze), in which a drive shaft 5 is journaled. An oil cup 5$^b$ seated in a tapped hole in the hollow brace 2 communicates with an orifice in the bearing 4 to supply lubricant to the drive shaft.

The shaft projects from the opposite ends of the bearing 4 beyond the legs 3, 3$^a$ thereof, the forwardly projecting portion of the shaft terminating in a spindle 5$^a$ adapted to support the usual reel or spool 6 (Fig. 1) on which the films are wound. A spline or key 7 (Fig. 5) on the spindle, enters the usual keyway (not shown) in the hub of the spool 6, to cause the latter to turn with the spindle in the usual manner.

A collar 8 located at the juncture of the bearing portion of the shaft 5 and the spindle 5ª, contacts the outer face of the outside leg 3ª to prevent inward movement of the shaft relatively to the standard, and affords a stop for the inner end of the hub of the spool 6, when placed on the spindle.

In former winding machines, with the exception of that shown in my prior pending application, the spindle extends rearwardly behind the machine, which renders it necessary for the operator to reach over the machine and fit the spool onto the spindle by the sense of touch. This also brings the hands and clothing of the operator into dangerous proximity to the machine, besides occasioning inconvenience in fitting the spool blindly onto the spindle.

It will be noted that the spindle of the present invention, projects forwardly toward the operator, to enable the ready application of the reels to and their removal from the machine, the parts being in full sight.

The opposite end 9 (Fig. 5) of the drive shaft 5 is reduced and projects rearwardly beyond the rear leg 3 of the standard, to support the releasable drive and controlling mechanism for the shaft and spindle.

In the present form of my invention, I have provided a more accurate and sensitive driving means for the shaft 5, and to this end, I equip the combined fly and brake wheel 10, shown in my prior pending application, with a tubular barrel 11, projecting from the inner face of the web thereof and adapted to fit over the reduced portion 9 of the drive shaft, with its free end against the shoulder 12 at the juncture of the reduced portion 9 and the bearing portion 5 of the drive shaft. The shoulder 12 prevents inward thrust of the drive mechanism on the shaft. Set screws 13 (Figs. 5 and 9) pass through a hollow boss 14 formed on the outer face of the fly wheel 10, concentrically with the barrel 11, and engage the outer end of the reduced portion 9 of the drive shaft, to secure the parts in place. A retaining screw 15 threaded longitudinally into the rear end of the drive shaft 9, has a head 16 of sufficient diameter to overlie the centrally located boss 14 of the fly wheel, and with the set screws 13, prevents the endwise disengagement of the drive and control members, from the drive shaft.

An annular wall 17 on the inner face of the web of the fly wheel incloses a chamber 18, the free edge of the wall being beveled as at 19, to form the fast drive member of a separable pulley or drive, with which coacts the beveled face 20 of the adjustable member 21 of the separable drive. The hub 22 of the adjustable drive member is journaled on the barrel 11 of the fast drive member, and is slidable longitudinally thereon, to confine or release a drive belt 23 (preferably round in the present embodiment of my invention) which passes between the separable drive or pulley members.

The hub 22 of the adjustable drive member is of much smaller diameter than the chamber 18, and in order to prevent the belt from slipping into the chamber when the adjustable drive member is separated from the fast drive member, I provide what I have termed a free wheel 24 interposable between the adjustable and fast drive members, and equipped with an antifriction bushing 25 (preferably of bronze) journaled on the hub 22 of the adjustable drive member.

The periphery of the free wheel 24 lies flush with bases of the inclined faces 19 and 20 of the fast and adjustable drive members, the inner face of the adjustable drive member being recessed at 26, to fit over the adjacent edge of the free wheel.

Figures 10, 11:
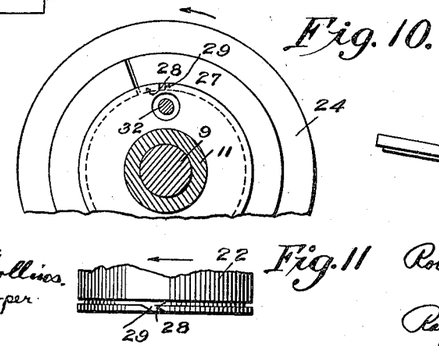
Fig. 10 is a fragmentary sectional view through the drive shaft, to show the locking washer which holds the free wheel in place.
Fig. 11 is a detail plan view showing the manner of applying the washer.

The hub 22 of the adjustable drive member protrudes slightly beyond the free wheel 24, which is held in place against the web of the adjustable drive member by means of a split spring or locking washer 27, (Figs. 5, 10, and 11), whose inner periphery lies in a circular seat 28 formed around the protruding portion of the hub 22. The locking ring is introduced to its seat by inserting one of the split ends thereof in a groove 29 leading from the outer end of the hub to the seat 28, and turning the washer relatively to the hub until it is fully entered in its seat.

The ring 27 prevents endwise movement of the free wheel 24 on its supporting hub 22, so that the adjustable drive member 21 and the free wheel shift together toward and from the fast member, the free wheel entering the chamber 18 as the adjustable member 21 shifts toward the fast member 17, and emerging from the chamber 18 during the withdrawal of the adjustable member. The free wheel 24 has a sliding fit along the inner periphery of the annular wall 17, the width of the free wheel being sufficient to extend between the beveled faces 19 and 20 of the separable members, at all times.

An absorbent pad 30, of felt or other suitable material, lies in an annular recess 31 formed on the inner face of the web of the adjustable drive member 21, and is soaked in oil to provide lubricant for the abutting surfaces of the free wheel and adjustable member respectively.

In this form of my invention, I prefer to employ means normally tending to separate the drive members 17 and 21, and to this end, I provide the hub 22 of the slidable drive member with oppositely located pilot studs 32 projecting axially therefrom across the chamber 18, the free ends of the studs entering guide sockets 33 formed axially of the central boss 14 of the fast drive member. Springs 34 encircle the pilot studs, and bear at their opposite ends against the boss 14 and the hub 22, respectively, to normally retain the drive members separated, as shown in Fig. 5, in which figure, it will be noticed that the periphery of the free wheel 24 closes the space between the inclined faces 19 and 20 of the drive members.

In this position of the parts, the continuously driven belt 23 is slack and its upper bight rests on the free wheel 24, which turns idly on the hub 22 of the adjustable pulley or drive member 21 without communicating motion thereto or to the fast member 17. The inclined walls 19 and 20 of the fast and adjustable drive members, prevent displacement of the slackened belt 23.

The belt passes around the free wheel 24 (Figs. 1 and 2) and down through a slot 35 (dotted lines, Fig. 2) in the table 1 to a drive pulley 36 mounted on the power or armature shaft 37 of a motor 38, located beneath the table, in accordance with the legal requirements, and out of the way of the flying ends of the film, when the latter breaks. The motor circuit 39 may be closed through a switch 40 located at the edge of the table, as shown in Fig. 1.

By shifting the slidable drive member 21 toward the fast drive member 17, against the tension of spring 34, the bight of the belt is picked up from the periphery of the free wheel 24, and confined between the two diverging faces 19 and 20, up which it is caused to ride to tighten the belt and enable it to turn the members and the drive shaft.

Springs 34 shift the slidable drive member in the opposite direction, and release the belt which then rides down the inclined faces 19 and 20, gradually slackening, until it rests on the free wheel 24 which has been brought to effective position, by the lateral withdrawal of the slidable drive member from its fast drive member.

To enable the operator to effect or prevent the transmission of power to the drive shaft 5 and spindle 5ª, I provide a controlling means for the slidable drive member 21, which means is actuated by a suitable fulcrumed pedal 41 intermediate the ends of which, at 42, is connected the lower end of a control rod 43, extending upwardly through alined apertures in the table 1 and in the base $a'$ of the standard A.

A fixture 44 threaded on the upper end of the control rod, is secured to a crank 45 fastened to a counter shaft 46 journaled in the legs 3, 3ª of the standard, parallel with and preferably beneath the drive shaft 5.

The control rod 43 may be made in sections connected by a union 47 (Fig. 2) to permit of its adjustment to tables of different heights, and the crank 45 is also adjustably secured by a set screw 48 to the counter shaft 46, the hub of the crank filling the space between the internal bosses 49 (Fig. 1) on the legs 3, 3ª, to prevent endwise movement of the counter shaft.

A spring 50 encircles the upper end of the control rod 43, the lower end of which spring rests on the base $a'$ of the standard. A tensioning nut 51 threaded on the control rod 43 contacts the upper end of the spring to regulate the tension thereof, and is held where adjusted by a lock nut 52.

The releasing spring 50 tends to hold the pedal 41 in raised position and rock the counter shaft 46 counter-clockwise.

The countershaft 46 extends rearwardly of the standard beneath the reduced portion 9 of the drive shaft 5, to form a support for a strap or holder, the vertical stock 53 (Figs. 1, 3, 4 and 7) of which terminates at its lower end in a bearing or eye 54 journaled on the counter shaft 46.

A ring-shaped head 55 on the upper end of the stock 53 accommodates a circular controlling disk or member 56 fitted around the barrel 11 of the fast drive member, the outer or forward face of the disk abutting against a thrust collar 80 secured by a set screw 81 to the barrel 11, to resist end thrust, the inner face of the disk being equipped with one or more cam rises 57 adapted to coact with cam rises 58 (Figs. 5 and 6) located on the opposing inner face of a corresponding disk or controlling member 59 rotatably and slidably mounted on the barrel 11, and similarly secured in the ring-shaped head 60 of a strap or holder. The stock 61 of the head 60 projects laterally from the drive shaft 9, and is pivotally connected, at 62, to the upper end of a depending link 63, the lower end of which is pivotally connected at 64 to an arm 65, fixed to and projecting from the rear end of the counter shaft 46.

The control member 56 is held stationary against lateral play, by the thrust collar 80 and the stock 53, the latter being confined against movement on the counter shaft 46, between the external boss 66 on the rear leg 3 of the standard, and the hub 67 of the projecting arm 65.

The stocks 53 and 61 and the heads 55 and 60 of the straps or holders for the control members, are split, as shown in Figs. 6 and 7, to releasably clamp about the control disks or members 56 and 59.

This permits rotatory adjustment of the disks relatively to each other to compensate for wear of the cam rises 57, 58.

One set of cam rises, as 57, are of greater length or extent, than the cam rises 58, in order to materially lengthen the effective life of the parts by providing for an indefinite number of adjustments before the cams are worn out.

In addition, the control members or disks are laterally adjustable relatively to their heads 55 and 60, the active control member 59 being located between the stationary control member 56 and the forward face of the shiftable drive member 21, and such lateral adjustment of the control disks, regulates the distance between the fast and slidable drive members to enable belts of various sizes to be used.

Clamping screws 68 pass through the split portions of the stocks 53 and 61 to contract the heads 55 and 60 snugly around the disks 56 and 59.

A stub shaft 69 (Figs. 3 and 4) mounted in the free end of the control arm 65, parallel with the drive shaft 5, supports a belt tightening pulley 70 located in the same vertical plane with the sectional drive pulley 17, 21, (Figs. 1 and 4), the belt tightener 70 adapted to contact the belt 23 and take up slack therein.

The belt tightener is permitted a slight amount of side play on the stub shaft 69 (Fig. 4) to enable it to follow the belt, as the latter plays laterally on the sectional drive pulley 17, 21, such play of the belt tightener being limited by the arm 65 on one side and by the stationary head 71 of a common form of serrated coupling, whose adjustable head 72 coacts with the stationary head 71 and is held where adjusted by a lock screw 73. Further description of this coupling is thought to be unnecessary.

The adjustable coupling head 72 carries a radially projecting arm 74, to whose outer end is secured the tongue 75 of a brake shoe 76 fitted to the contour of, and adapted to contact, the fly wheel 10. A locking screw 77 adjustably secures the tongue 75 of the brake shoe to the radial supporting arm 74, and in conjunction with the adjustable coupling 72, enables an accurate adjustment of the brake shoe to accommodate itself to the periphery of the fly wheel. The brake shoe 76 is preferably lined with a flexible friction material 78, as leather, which is removably secured thereto by the fastenings 79.

The outer face of the stationary control member 56 carries a threaded neck 82 (Fig. 5) adapted to be packed with lubricant. A cap 83 apertured to fit over the rear end of the driveshaft 5 just in front of the shoulder 12, screws onto the neck 82 and is suitably lined as at 84, to prevent the escape of the lubricant.

The annular head 60 of the strap or holder for the shiftable control disk or member 59 is wider than the annular head 55 in which the control disk or member 56 is held, and extends across and closes the space between the two control members (see Fig. 5) when the drive shaft is at rest, to permit lateral adjustment of the control member 59 to variously limit the extent of withdrawal of the slidable drive member and to prevent the entrance of extraneous material between the control members.

When the control members 56 and 59 are forced apart by the engagement of the cam rises 58 with the stationary cam rises 57, to shift the slidable drive member 21 toward its fast drive member 17, and cause the belt 23 to turn the drive shaft and spindle, the lubricant might be thrown out from between the control members, by centrifugal force, to prevent which, I mount the shiftable control member 59 on a sleeve 85 fast in, and projecting from the bore of the control member 56, the sleeve inclosing that part of the barrel 11, between the slidable drive member 21 and the thrust collar 80. The sleeve 85, being fast with the stationary control member 56, does not rotate, and hence, confines the lubricant on the barrel 11 to prevent its loss through the opening between the control members.

Furthermore, an annular guard or shield 86 projecting from the rear face of the shiftable control member 59, incloses the space between the side face of such control member and the web of the slidable drive member 21, to confine the lubricant at this point, against being thrown off by centrifugal force.

In the normal position of the parts, the spring 50 bearing against the tensioning nut 51 forces the control rod 43 upwardly, raising the pedal 41 and rocking the crank 45 and the counter shaft 46, counter-clockwise. Rotation of the counter shaft in such direction, raises the depending control arm 65 to press the brake shoe 76 snugly against the periphery of the fly wheel 10, whereby to instantly arrest the latter against rotation.

Furthermore, the counter-clockwise rotation of the control arm 65, raises the link 63, to turn the strap or holder 60, 61 and the rotatable and slidable control member 59, relatively to the coacting stationary control member 56, to disengage the cam rises 58 of the rotatable and slidable member from the opposing cam rises 57 of the stationary member. This enables the compressed releasing springs 34 to force the slidable drive member or pulley section 21 away from the fast drive member or pulley section 17, to liberate the belt 23 and allow it to rest on the periphery of the free wheel 24 which slides out of chamber 18, as the drive member 21 withdraws from the fast drive member 17.

The rotatable control member 59 and its strap or holder slide longitudinally of the barrel 11 by reason of the expansion of the releasing springs 34, during the separation of the drive members, such longitudinal travel of the rotatable control member being permitted by its loose pivotal connection 64 with the arm 65.

To start the machine for operation, I will assume that the motor switch 40 has been turned to connect the motor 38 with a suitable power supply. The power or armature shaft 37 of the motor drives the pulley 36 and belt 23, which latter rides loosely on the free wheel 24, turning the latter and its bushing 25 idly on the hub 22 of the adjustable drive member 21.

When the operator desires to wind or rewind a film, he places an empty spool or reel 6 on the spindle 5ª so that the usual keyway in the hub of the spool fits over the key 7 on the spindle.

The coil of film to be wound or rewound is preferably placed on a spindle (not shown) adjacent to and parallel with the spindle 5ª, so that the coil and the empty spool 6 lie in the same horizontal plane.

The operator then depresses the pedal 41 to draw downwardly the control rod 43 against the tension of the spring 50, and rock the crank 45 in a clockwise direction to turn the counter shaft 46.

The counter shaft rocks the control arm 65 supporting the belt tightener or pulley 70 and the brake shoe 76, to withdraw the brake from engagement with the fly wheel 10, thereby freeing the latter and the drive shaft for rotation. The control arm 65 also swings the belt tightener 70 against the belt 23 to cause it to take up surplus slack therein, should the belt stretch unduly after long usage, as hereinafter explained.

My pending application shows the pedal control of the brake and belt tightener, but the present invention goes further, as follows:

The control arm 65, when rocked downwardly by depression of the pedal, draws link 63 downwardly to turn the shiftable control member 59 on the sleeve 85, and cause its cam rises 58 to ride up on the cam rises 57 of the stationary control member 56. Naturally, this forces the shiftable control member 59 longitudinally of the sleeve 85 and barrel 11, against the hub 22 of the slidable drive member 21 to crowd the latter toward the fast drive member 17, against the tension of the releasing springs 34. As the slidable drive member 21 slides over toward the fast drive member, the inclined face 20 of the slidable member contacts the driving belt 23 to shift it against the inclined face 19 of the fast member and finally forces it to ride up the inclined faces 19 and 20 to thereby take up the slack in the belt, and cause it to turn the drive members. The drive members transmit motion to the drive shaft 9, 5, and spindle 5ª through the set and retaining screws 13 and 15, which connect the fast drive member to the drive shaft.

The inclined or beveled faces 19 and 20 of the fast and adjustable drive members take under the bight of the drive belt, as the adjustable drive member approaches the fast drive member, to tauten the belt, and the belt tightener 70 is only employed in this invention, to take up such surplus slack as may develop after the belt has stretched to such an extent that the amount of slack which the inclined faces 19 and 20 are capable of taking up, will not sufficiently tighten the belt, or will permit the belt to slip under an extra load.

The free wheel 24 which shifts with the slidable drive member 21, enters the chamber 18 as the adjustable drive member approaches the fast drive member, and the releasing springs 34 contact and are pressed against the boss 14 ready to act upon the release of the fast pedal, to separate the drive members.

It will be observed that the cam rises 58 can ride up the inclined cam rises 57 and upon continued depression of the pedal 41, the cam rises 58 will traverse the cam rises 57 without forcing the shiftable drive member 21 any closer toward its fast drive member.

By permitting such extra relative movement of the cam rises, the continued depression of the pedal is utilized to force the belt tightener 70 to take up the surplus slack. The operator will, of course, only depress the pedal to that point in its travel at which the film is wound at the speed desired, but in case the drive members cannot take up all the slack in the drive belt, and slippage still occurs when the cam rises 58 first ride upon the rises 57, then further depression of the pedal will render the belt tightener 70 effective and no binding between the cam rises will take place.

The parts remain in this position and the spindle rotates, so long as the operator maintains the pedal depressed, and by varying the pressure thereon the position of the slidable drive member 21 may be adjusted to variously slacken or tauten the belt, and thus regulate the speed of rotation of the drive shaft. This enables the operator to accurately and quickly control the speed at which the film is wound, to permit inspection.

By employing the fast and slidable drive members to control slack in the belt, the belt tightener 70 is so adjusted to be of service only to take up excess slack for which the drive members cannot compensate.

By completely releasing the pedal 41 to the action of spring 50, the brake 76 is immediately applied to the fly wheel to instantaneously arrest rotation of the spindle, on which the film is mounted, and the belt tightener 70, if effective, is withdrawn from the belt. Furthermore, the shiftable control member 59 is reversely rotated relatively to the stationary control member 56, to disengage the cam rises 58 from the cam rises 57 and enable the releasing springs 34 to force the slidable drive member 21 away from the fast drive member 17, and slacken the belt. Separation of the slidable drive member from the fast drive member draws the free wheel out of the chamber 18 and interposes it beneath the belt 23, which is idly supported thereon.

Attention is called to the fact that the separable drive members 17, 21 and the control members are all mounted on the drive shaft 9, 5, and that the shiftable drive member 21 and the control members 56, 59 therefor, are all mounted on the barrel 11 of the fast drive member.

By securing the thrust collar 80 to the barrel 11 and mounting the control members 56, 59 and the adjustable drive member 21 between the thrust collar and the fast drive member 17, the thrust of the rotatable control member 59 against the stationary control member 56 which would tend to shift the drive shaft 5 to the right (Fig. 5) is equalized in the opposite direction by the thrust of such rotatable control member to the left against the adjustable drive member 21 and the fast drive member 17 to which the barrel 11 is connected, so that no thrust in either direction is imparted to the main drive shaft 5, which is thereby relieved of friction. For this reason, no means is required to hold the main drive shaft in position in its bushing 4 against longitudinal travel, the collar 8 serving merely as a locating stop in assembling the parts, and to space the spool away from the standard.

If a winding machine, such as above set forth, is associated with a similar machine to support the coiled supply film which is to be rewound, it would be a very easy matter to connect the respective machines in such manner that the pedal of one machine when depressed, would control the other machine, to release the brake.

I have provided improved means to secure the empty spool 6 on the spindle 5ᵃ against disengagement therefrom, which, in the present instance, includes a retainer (Fig. 8) applied to the free end of the spindle, in place of the common threaded nut or other fastenings heretofore in use.

This retainer comprises a hollow cylindrical arresting member 87, one end wall of which is apertured to fit over the outer end of the spindle 5ᵃ and bear against the hub of the spool 6. The opposite end of the cylindrical arrester is threaded to accommodate an apertured cap 88. A locking key 89 passes loosely into the hollow arrester through the opening in the cap, and is recessed at its inner end, as at 90, to fit over the free end of the spindle.

A locking pin or bit 91 carried by the inner end of the key 89, projects inwardly into the recess 90, to enter one end of a bayonet slot or groove 92 (Figs. 5 and 8) formed on the free end of the spindle, the open end of the slot lying flush with the end of the spindle. The key is turned on the spindle to cause the locking pin or bit 91 to follow the slot until it brings up against the closed end thereof, where it is yieldingly held by a spring 93 inclosed in the arrester, one end of the spring bearing against the end wall of the arrester and the opposite end of the spring pressing against an annular shoulder 94 formed on the stem of the key 87 to hold the pin 91 in the closed end of the slot and prevent the disengagement of the retainer and spindle. The shoulder 94 also prevents the disengagement of the key and the cap 88.

In applying the retainer to the spindle, the operator grasps a knurled head 95 on the outer end of the key 89 and fits the aperture in the end wall of the arrester 87 over the free end of the spindle 5ᵃ, after which he slides the arrester onto the spindle, the free end of which passes through the center of the coiled spring 93 and into the recess 90 in the stem of the key, until the end of the spindle contacts the locking pin 90. Meanwhile, the inner end of the arrester has contacted the outer end of the hub of the spool or reel 6 and the pressure on the key 89 has compressed the spring 93. The key and spindle are now relatively rotated until the locking pin 91 enters the open end of the bayonet slot 92, whereupon the key is pressed farther onto the end of the spindle against the tension of the spring 93, the locking pin 91 following the slot until it reaches the closed end thereof.

The key is now released to enable the spring 93 to force the locking pin into the closed end of the slot, and thus hold the retainer in place.

It will be observed that the retainer will remain effective in either direction of rotation of the spindle.

By pressing inwardly on the head 95 to force the key inwardly and disengage the locking pin 91 from the closed end of the locking slot 92, and then turning the key until the locking pin registers with the open end of the slot, the retainer may be quickly removed to release the spool.

Changes may be made in the form and arrangement of the several parts set forth, some of which may be omitted without departing from the spirit and scope of my invention.

What I claim as new, is:—

1. The combination with a power shaft; and a drive shaft; of separable drive members, one of which is connected to the drive shaft, and the coacting member adapted to shift relatively to the fast drive member; a stationary control member; a rotatable control member coöperable therewith, and shiftable between the stationary control member and the adjustable drive member to control the position of the latter; and connecting means between the power shaft and drive members, rendered effective by the adjustable drive member when shifted toward the fast drive member.

2. The combination with a power shaft, and a drive shaft; of separable drive members, one of which is fast on the drive shaft, and the coacting member of which is adapted to shift toward and from the fast drive member; means normally tending to shift the adjustable drive member in one direction; a stationary control member; a rotatable control member to coact therewith and shiftable between the stationary control member and the adjustable drive member to adjust the latter relatively to its fast drive member; and connecting means actuated by the power shaft to turn the drive members when the adjustable drive member is in one of its positions.

3. The combination with a power shaft, and a drive shaft; of a drive member connected to the drive shaft; a coöperating drive member shiftable relatively to the fast drive member; means to control the position of the shiftable drive member; a connection between the power shaft and drive members; and a support for the connection, freely rotatable relatively to the drive members, and rendered effective to sustain the connection when the shiftable drive member is in idle position.

4. The combination with a power shaft, and a drive shaft; of a drive member connected with the drive shaft to turn therewith, a coöperable drive member shiftable to idle and operative positions relatively to the fast drive member; means to control the position of the shiftable drive member at will; and an endless connection from the power shaft to the drive members, adapted to be confined between the fast and shiftable drive members when the latter is in operative position.

5. The combination with a power shaft, and a drive shaft; of a drive member connected with the drive shaft to turn therewith, a coöperable drive member shiftable to idle and operative positions relatively to the fast drive member; means to control the position of the shiftable drive member at will; an endless connection from the power shaft to the drive members; a freely rotatable support for the connection, located between the drive members and adapted to sustain the connection when the adjustable drive member is shifted away from the fast drive member; the adjustable drive member adapted to confine the endless connection between itself and the fast drive member, when shifted toward the latter.

6. In a power transmitting mechanism, the combination with a drive shaft; of separable drive members mounted on the drive shaft, one of the members connected to turn with the drive shaft; the coacting drive member adapted to shift relatively to the fast drive member; a drive belt passing between the drive members; and adapted to be confined between the latter, to turn the drive shaft; yielding means tending to shift the adjustable drive member to idle position to release the belt; an idly rotatable support for the endless belt, adapted to sustain the latter when the adjustable drive member is shifted to idle position; and means to control the position of the shiftable drive member.

7. The combination with a drive shaft; and an endless drive belt; of a separable pulley; one section of the pulley connected to turn with the drive shaft; the coacting pulley section adapted to shift relatively to the fast pulley section; the pulley sections each having an inclined face, between which the belt passes; and control means to shift the adjustable pulley member toward the coacting fast member, whereby the inclined pulley faces engage and tauten the belt, to effect the rotation of the drive shaft, or to permit the separation of the adjustable section from its fast section to release the belt from between the inclined faces.

8. The combination with a drive belt; and a drive shaft; of separable drive members having opposed inclined faces between which the belt passes, one of the drive members being connected to the shaft to turn therewith, and the coacting member being adjustable toward and from the fast member, to cause the belt to ride up on the inclined faces, or to release the belt; and a free wheel interposed between the inclined faces, and effective to support the belt when the adjustable drive member is withdrawn from its coacting fast member.

9. The combination with a drive belt; and a drive shaft; of separable drive members having opposed inclined faces between which the belt passes; one of the drive members being connected to the drive shaft to turn therewith; the coacting member being adjustable toward and from the fast member, to cause the belt to ride up on the inclined faces and turn the drive members, or to release the belt; and a free wheel whose periphery lies flush with the bases of the inclined faces and effective to support the belt when the belt is released.

10. The combination with a drive belt; and a drive shaft; of separable drive members having opposed inclined faces between which the belt passes; one of the drive members being connected to the drive shaft to turn therewith; the coacting member being adjustable toward and from the fast member, to cause the belt to ride up on the inclined faces and turn the drive member, or to release the belt; and a free wheel journaled on the hub of the adjustable drive member and shiftable therewith relatively to the fast member, to close the space between the inclined faces when the adjustable member is withdrawn from its fast member and afford a support for the belt when released.

11. The combination with a drive belt; and a drive shaft; of separable drive members between which the belt passes, one of the drive members having a recessed boss and secured to the drive shaft to turn therewith; the coacting drive member adjustable toward and from the fast drive member to render the belt effective or ineffective; guide studs carried by the adjustable drive member and entered in the recesses in the fast drive member; springs on the studs between the adjustable and fast drive members to normally hold them apart; and controlling means to shift the adjustable drive member toward the fast drive member against the tension of the springs.

12. The combination with a drive belt; and a drive shaft; of separable drive members between which the belt passes, one of the drive members secured to the drive shaft; the coacting drive member adjustable toward and from the fast drive member to enable the belt to drive the shaft, or to release the belt; springs interposed between the fast and adjustable drive members to normally hold them apart; and controlling means to adjust the adjustable drive member toward the fast drive member against the tension of the springs.

13. The combination with a drive belt; and a drive shaft; of separable drive members between which the belt passes; one of the drive members being secured to the drive shaft to turn therewith, and having an axial barrel fitted over the drive shaft; the coacting drive member slidably mounted on the barrel of the fast drive member, and adjustable toward and from the fast drive member to tighten or release the belt; and a free wheel interposed between the adjustable and fast drive members, the periphery of which wheel is sufficiently wide to close the space between the adjustable and fast drive members when separated, to support the slackened belt.

14. The combination with a drive belt; and a drive shaft; of separable drive members between which the belt passes; one of the drive members being secured to the drive shaft, and having a chamber formed therein; the coacting drive member adjustable toward and from the fast member, to tighten or release the belt; and a free wheel connected for simultaneous adjustment with the adjustable drive member, into and out of the chamber in the fast drive member, and rotatable independently of the drive members, the periphery of which wheel is adapted to close the space between the adjustable and fast drive members, when separated, to support the slackened belt.

15. The combination with a drive belt; and a drive shaft; of separable drive members between which the belt passes; one of the drive members being chambered and secured to the drive shaft; and having a barrel fitted over the drive shaft; the coacting drive member slidably mounted on the barrel for adjustment toward and from the fast drive member, to tighten or slacken the belt; and a free wheel journaled on the hub of the adjustable drive member for simultaneous adjustment therewith into and out of the chamber in the fast drive member; the periphery of the wheel adapted to close the space between the drive members when separated, and support the slackened belt.

16. The combination with a drive belt; and a drive shaft; of separable drive members between which the belt passes; one of the drive members being connected to turn with the drive shaft, the coacting drive member adapted for adjustment toward and from the fast drive member, to confine or release the belt; and controlling means to effect such adjustment in one direction, including a stationary cam member; and a rotatable cam member interposed between the adjustable drive member and the stationary cam member, and coöperable with the latter to shift the adjustable drive member toward the fast drive member.

17. The combination with a drive belt; and a drive shaft; of separable drive members between which the belt passes; one of the drive members being connected to turn with the drive shaft, the coacting drive member being slidably supported by the shaft to enable it to shift toward and from the fast drive member to confine or release the belt; and controlling means to effect such adjustment in one direction, including stationary and rotatable cam disks encircling the shaft; the rotatable cam disk also adapted to slide relatively to the shaft, and interposed between the stationary cam disk and the adjustable drive member, to force the latter toward the fast drive member, or to release it for withdrawal therefrom.

18. The combination with a drive belt; and a drive shaft; of separable drive members between which the belt passes; one of the drive members being connected to turn with the drive shaft, the coacting drive member adapted for adjustment toward and from the fast drive member, to confine or release the belt; and controlling means to effect such adjustment in one direction, including a stationary cam member; and a rotatable cam member interposed between the adjustable drive member and the stationary cam member, and coöperable with the latter to shift the adjustable drive member toward the fast drive member; and a strap or holder in which one at least of the cam members is adjustably clamped.

19. The combination in a film winding and rewinding machine, with a standard; of a drive shaft whose central portion is journaled therein, and terminating at one end in a spindle, the opposite end of the drive shaft being reduced to form a shoulder; separable drive members, one of which is fast with the drive shaft; a barrel projecting from the fast drive member and encircling the reduced portion of the drive shaft, the free end of the barrel adapted to lie against the shoulder on the shaft; the coacting drive member being slidably mounted on the barrel for adjustment toward and from the fast drive member; a drive belt adapted to pass between the adjustable and fast drive members; yielding means normally tending to separate the drive members to release the belt; controlling means for the drive members, including coacting stationary and rotatable cam members encircling the barrel of the fast drive member; a thrust collar on the barrel against which the stationary cam member bears, and by which it is held against movement in one direction; an independently-supported strap or holder in which the stationary cam member is clamped, the coacting cam member located between the stationary cam member and the adjustable drive member, to shift the latter toward the fast drive member, and permit its withdrawal therefrom; and means to operate the coacting cam member.

20. In a film winding and rewinding machine, the combination with a drive belt, a standard, and a drive shaft, journaled in the standard; of separable drive members between which the belt passes, one of the drive members being fast with the shaft; and the coacting drive member being adjustable toward and from its fast drive member to confine and release the belt; and controlling means to shift the adjustable drive member at will.

21. In a film winding and rewinding machine, the combination with a drive belt, a standard, and a drive shaft, journaled in the standard; of separable drive members between which the belt passes, one of the drive members being fast with the shaft; and the coacting drive member being adjustable toward and from its fast drive member to confine and release the belt; and controlling means to shift the adjustable drive member at will, including a stationarily-supported member having a cam rise, and a rotatable and laterally shiftable member interposed between the stationary member and the adjustable drive member, and having a cam rise to coact with that on the stationary controlling member; and means to operate the rotatable controlling member.

22. In a film winding and rewinding machine, the combination with a drive belt, a standard, and a drive shaft, journaled in the standard; of separable drive members between which the belt passes, one of the drive members being fast with the shaft; and the coacting drive member being adjustable toward and from its fast drive member to confine and release the belt; and controlling means to shift the adjustable drive member at will, including an annular disk encircling the drive shaft; a counter shaft; a strap or holder supported on the counter shaft, and having a split ring-shaped head to surround the periphery of the cam disk, to permit rotative and lateral adjustment thereof relatively to the head; means to clamp the ring-shaped head about the disk to hold it where adjusted; a similar cam disk interposed between the adjustable drive member and the first named cam disk, and adapted to coact with the latter; a strap or holder having a split ring-shaped head releasably clamped about the last named disk; means to rock the counter shaft; an arm on the counter shaft; and means to connect the last named strap and the arm, to turn the last named cam disk relatively to the first named disk to shift the adjustable drive member toward the fast drive member.

23. In a film winding and rewinding machine, the combination with a drive belt, a standard, and a drive shaft, journaled in the standard; of separable drive members between which the belt passes, one of the drive members being fast with the shaft; and the coacting drive member being adjustable toward and from its fast drive member to confine and release the belt; and controlling means to shift the adjustable drive member at will, including an annular disk encircling the drive shaft; a counter shaft; a strap or holder supported on the counter shaft, and having a split ring-shaped head to surround the periphery of the cam disk, to permit rotative and lateral adjustment thereof relatively to the head; means to clamp the ring-shaped head about the disk to hold it where adjusted; a cam disk interposed between the adjustable drive member and the first named cam disk, and adapted to coact with the latter; a strap or holder having a split ring-shaped head releasably clamped about the last named disk; means to rock the counter shaft; an arm on the counter shaft; means to connect the last named strap and the arm, to turn the last named cam disk relatively to the first named disk to shift the adjustable drive member toward the fast drive member; and a guard sleeve carried by and projecting from the first named cam disk, and on which the rotatable cam disk shifts.

24. In a film winding and rewinding machine, the combination with a drive belt; a drive shaft; and a fly wheel; of separable drive members between which the drive belt passes; one of which is fast with the shaft, and the coacting drive member adapted for adjustment toward and from the fast member; controlling means to shift the adjustable drive member, including stationary and rotatable cam members, respectively; a brake for the fly wheel; and means to simultaneously release the brake and operate the rotatable cam member to shift the adjustable drive member toward the fast drive member, or to apply the brake and permit the withdrawal of the adjustable drive member to idle position.

25. In a film winding and rewinding machine, the combination with a drive belt; a drive shaft; a brake; and a fly wheel; of separable drive members between which the belt passes; one of the drive members being fast with the shaft; the coacting drive member adapted for adjustment toward and from the fast member to confine or release the belt; and controlling means to shift the adjustable drive member, and to simultaneously control the application of the brake to the fly wheel.

26. The combination with a drive belt; and a drive shaft; of separable drive members, between which the belt passes; one of the drive members connected to turn with the shaft, and having a barrel encircling the shaft; the coacting drive member mounted on the barrel for adjustment relatively to its fast drive member to engage or release the belt; controlling means mounted on the barrel to effect such adjustment, and including a shiftable member working between a coacting stationary member fast on the barrel, and the adjustable drive member, whereby the thrust of the shiftable control member against the adjustable drive member in one direction is equalized by the opposite thrust of the shiftable control member against the stationary control member, to relieve the drive shaft from thrust.

27. The combination with a drive belt; and a drive shaft; of separable drive members, between which the belt passes; one of the drive members connected to turn with the drive shaft; the coacting drive member adapted for adjustment relatively to the fast drive member to engage or release the belt; controlling means to effect such adjustment, including coöperating stationary and rotatable cam members, the rotatable cam member located between the stationary cam member and the adjustable drive member; a strap or holder in which at least one of the cam members is held for rotative and longitudinal adjustment relative to the holder, and means to maintain the cam member where adjusted in the holder.

28. The combination with a drive belt; and a drive shaft; of separable drive members between which the belt passes; one of the drive members being secured to the drive shaft to turn therewith; the coacting drive member being slidably mounted on the drive shaft, and adjustable toward and from the fast drive member to engage or release the belt; and a free wheel interposed between the drive members, the periphery of which wheel is wide enough to extend between the drive members where the latter are separated, to support the released belt.

29. The combination with a drive belt; and a drive shaft; of separable drive members, between which the belt passes; one of the drive members being connected with the shaft to turn therewith; the coacting drive member arranged for adjustment toward and from the fast drive member; means to shift the adjustable drive member relatively to its fast drive member; and means to connect the drive members in any of their relative positions to cause them to turn as one.

30. The combination with a drive belt; and a drive shaft; of separable drive members, between which the belt passes; one of the drive members being connected with the shaft to turn therewith; the coacting drive member arranged for adjustment toward and from the fast drive member; means to shift the adjustable drive member relatively to its fast drive member; one of the drive members having sockets formed therein; studs carried by the other drive member and entered in the sockets in the first named drive member to prevent relative rotation of the drive members.

31. The combination with a power shaft; and a drive shaft; of separable drive members, one of which is connected to the drive shaft, and the coacting member of which is adapted to shift relatively to the fast drive member; a stationary control member, including a cam whose high point merges into a dwell surface; a rotatable control member coöperable with the stationary control member, and shiftable between the stationary control member and the adjustable drive member, to control the position of the latter; said rotatable control member including a cam to coact with the stationary cam and dwell surface, whereby the rotatable cam member can ride past the high point of the stationary cam member and along the dwell portion, to maintain the adjustable drive member in adjusted position;

and connecting means between the power shaft and the drive members, which connecting means is rendered effective to turn the drive shaft, by the adjustable drive member when shifted toward the fast drive member.

32. The combination with a power shaft; and a drive shaft; of separable drive members, one of which is connected to the drive shaft, and the coacting member of which is adapted to shift relatively to the fast drive member; a stationary control member, including a cam whose high point merges into a dwell surface; a rotatable control member coöperable with the stationary control member, and shiftable between the stationary control member and the adjustable drive member, to control the position of the latter; said rotatable control member including a cam to coact with the stationary cam and dwell surface, whereby the rotatable cam member can ride past the high point of the stationary cam member and along the dwell portion, to maintain the adjustable drive member in adjusted position; connecting means between the power shaft and the drive members, which connecting means is rendered effective to turn the drive shaft, by the adjustable drive member when shifted toward the fast drive member; and a tightening member operable by the rotatable control member to take up slack in the connecting means, and increasingly effective as the rotatable control member turns in one direction relatively to the stationary control member, and as the cam of the rotatable control member rides along the dwell portion of the stationary control member.

ROBERT W. JONES.

Copies of this patent may be obtained for five cents each, by addressing the "Commissioner of Patents, Washington, D. C."